UNITED STATES PATENT OFFICE.

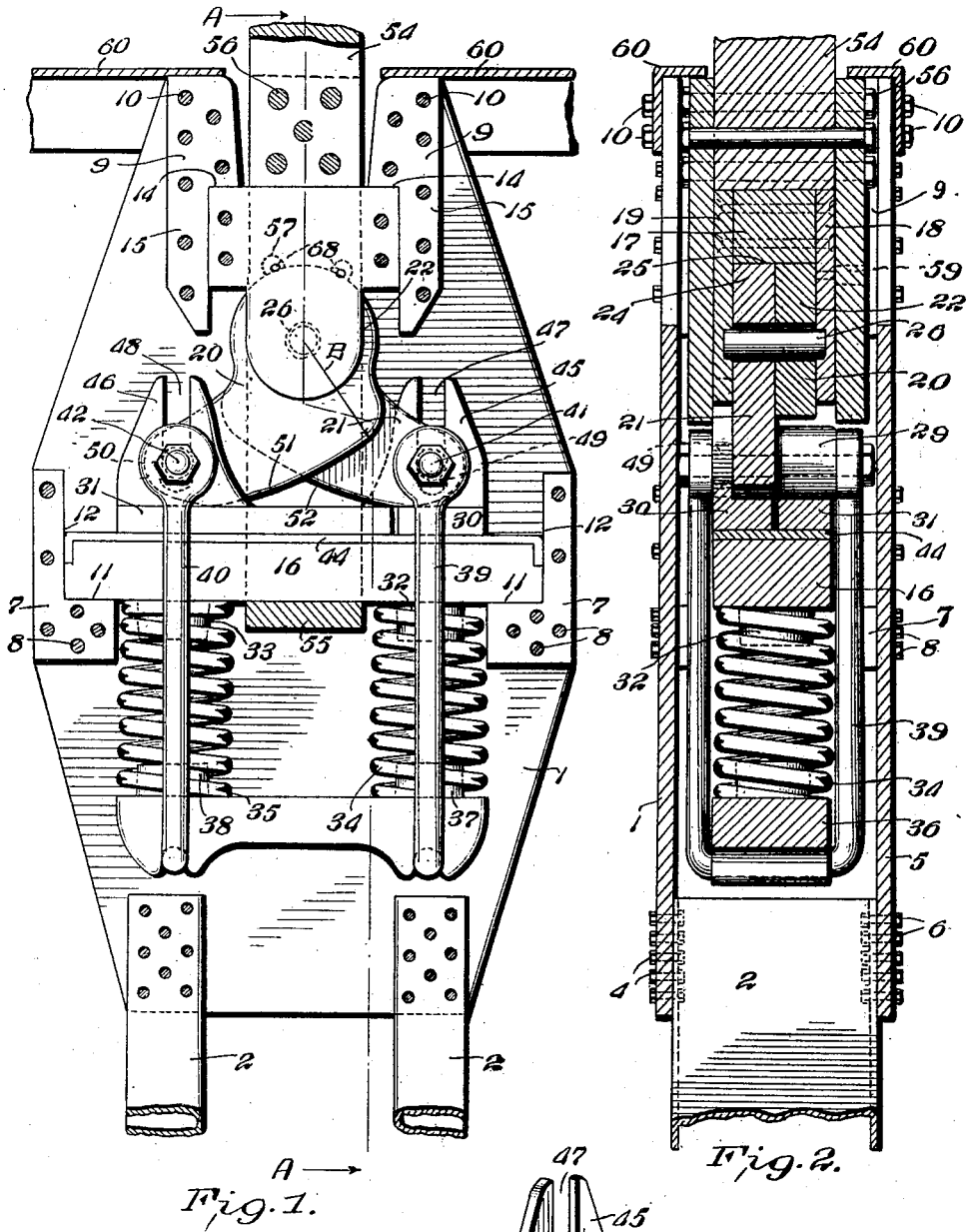

GEORGE W. RAMSEY, OF PEORIA, ILLINOIS.

FRICTION DRAFT-GEAR.

1,230,327.  Specification of Letters Patent.  Patented June 19, 1917.

Application filed March 22, 1911. Serial No. 616,191.

*To all whom it may concern:*

Be it known that I, GEORGE W. RAMSEY, a citizen of the United States, and a resident of Peoria, in the county of Peoria, State of Illinois, (whose post-office address is Provident Bank Building, Washington, D. C.,) have invented certain new and useful Improvements in Friction Draft-Gears, of which the following is a specification.

This invention relates broadly to draft gear appliances particularly adapted for railway equipment, and more specifically to friction draft gearing for railway cars.

The principal object of this invention is to construct a friction draft gear in which the mechanisms are so arranged as to prevent an abrupt shock when the draft gear springs are compressed to their limit of movement.

Another object of this invention is to provide a draft gearing with shock absorbing friction members and rotating stop members which are so arranged as to absorb buffing and pulling shocks thus preventing transmission of abrupt shocks to the vehicle body.

A further object of this invention is to construct a friction draft gear in which the parts are so arranged that all buffing and pulling shocks are transmitted through rocking stop members.

A still further object of this invention is to construct a friction draft gear in which the working efficiency of the elastic members in the gear automatically increases in proportion to the shock transmitted through the gear.

Other and further objects of this invention will in part be obvious and will in part be more specifically pointed out in the specification following, by reference to the accompanying drawings, in which like characters represent like parts througout the several figures thereof.

Figure 1 is a plan view of a friction draft gear with the top plate removed.

Fig. 2 is a sectional view taken upon line A—A of Fig. 1.

Fig. 3 is a detail view of one of the friction members.

In railway equipment it is extremely desirable that the draft gearing shall be so constructed as to be effective to transmit all pulling forces to the car structure without transmitting abrupt shocks, due to uneven application of power, to abrupt operation of brakes in adjoining cars, to coupling of cars, or to any one of the numerous causes that set up shocks in the line of draw bar pull. It is also extremely desirable that the draw bar springs be very resilient in order to absorb vibration shocks and jars, at the same time be sufficiently strong to withstand the most severe usage without danger of breakage. Heretofore it has been the usual practice to form the draw bar springs in such manner as to receive the shock directly, and to prevent breakage of the springs by a positive definite contact stop when the spring has reached a predetermined degree of compression. In seeking this end, appliances have been constructed wherein a certain portion of the shock is absorbed between friction surfaces that are arranged to receive increasing pressure as to the shock increases in degree. To reach this desideratum, the wedge principle has been commonly used to secure the increase of pressure proportionate to the increase of shock. In all wedge appliances the elements of construction very quickly reach a stage of positive locking wherein the whole device becomes inoperative and the shock as an entity is transmitted to the car. The present invention reaches the desideratum by means of rolling rocker stop members so arranged that the shock is transmitted to one end of the rocker member and absorbed by a resilient spring attached to the other end of the rocker member. In this construction the efficiency of the resilient spring increases in proportion to the draw bar pull, for the reason that the rolling member presents a moving fulcrum point which changes continually between the point of application of shock and the point of application of resilience, traveling toward the line of shock as the shock increases; the limit of the device being determined by a portion of the rocking face, which portion is at right angles to a radial line through the line of shock. At this point the effective efficiency of the resilient spring becomes infinite, therefore it is obviously impossible to reach the limit of the resilient spring. Therefore, it is obviously impossible for the device to transmit an abrupt shock to the car body, and it is impossible to break the draw bar spring by buffing and pulling strains.

Referring more particularly to the drawings, an under plate 1 is secured to the under frame sills 2, by means of bolts or rivets 4, or any other well known securing means. An upper plate 5 is likewise secured to the under frame sills 2, by means of bolts or rivets 6, in a manner similar to the attachment of the under plate. Rear follower stops 7, are mounted between the under plate 1 and the upper plate 2, by means of through bolts 8, and forward follower stops 9 are similarly mounted between the outer ends of the under plate 1 and the upper plate 2, by means of through bolts 10, or any well known attaching devices. The rear follower stops 7 comprise stopping portions 11 and guiding portions 12. The forward follower stops are in a similar manner provided with stopping or abutting portions 14 and guiding portions 15. A rear follower plate 16 is adapted to rest against the abutting portions 11 of the rear follower stops, and is guided in its forward movement between the guiding portions 12 on the rear follower stops. The forward follower plate is a built up block, and comprises a journal block 17, a lower retaining plate 18, and an upper retaining plate 19. Rocking members 20 and 21 are mounted between the retaining plates 18 and 19. An end sill 60 is firmly attached to the plates 1 and 5 by certain of the through bolts 10, in the members 9. The rocking members 20 and 21 are formed with circular head portions 22 and 24, which are seated against a concave journal face 25, formed upon the journal block 17. The rocking members 20 and 21 are retained in position by means of a retaining pin 26, that is carried between the retaining plates 18 and 19. The retaining pin 26 passes through openings in the rocking members 20 and 21, which openings are of a greater diameter than the diameter of the retaining pin, in order that the shocks transmitted from the rocking members may be transmitted through their contact with the journal block 17, instead of through the pin 26, the pin 26 merely acting as a retaining member and not being particularly adapted to carry the shocks. The outer ends of the rocking members 20 and 21 are formed with integral boss members 29. Sliding friction plates 30 and 31 are seated between the rear follower plate 16 and the rocking members 20 and 21, and slide over a friction wear plate 44. Studs 32 and 33 are formed upon the rear face of the rear follower plate 16, and are adapted to centralize draw bar springs 34 and 35 respectively, which carry upon their rear ends a yoke plate 36, upon which is formed studs 37 and 38, that also coöperate in centering the draw bar springs. Yoke members 39 and 40, are seated in the yoke plate directly over the longitudinal axes of the draw bar springs 34 and 35, and extend forwardly over the draw bar springs to the outer ends of the rocking members 20 and 21, respectively, where the yoke members are attached to the rocking members by means of bolts 41 and 42, which pass through the boss members 29 that are formed upon the rocking members 20 and 21. The sliding friction plates 30 and 31 are provided with guiding plates 45 and 46, in which are formed slots 47 and 48 respectively. The bolts 41 and 42 pass through collars 49 and 50, which collars are adapted to engage the side walls of the slots 47 and 48 respectively, in order to cause the friction plates to slide over the wear plate 44. The collars 49 and 50 permit tightening of the bolts 41 and 42 without binding the guiding plates 45 and 46 against the boss members 29. The rocking member 20 is provided with a rolling fulcrum face 51, and the rocking member 21 is similarly provided with a rolling fulcrum face 52. Each of the rolling faces 51 and 52, are curved in such manner that only one portion of the curve is a right angle tangent to a radial line from the center of rotation of its respective rocking member. The particular portion of the curve at which the right angle tangency occurs being designated by the arrow B in Fig. 1, with reference to the rocking member 21. A draw bar 54, carrying a coupler head (not illustrated) is attached to the draft gear mechanism by means of a draw bar yoke strap 55, that passes over the rear follower plate 16, and which is bolted to the draw bar by means of retaining bolts 56. The rear end of the draw bar is adapted to contact with the journal block 17 of the forward follower plate, and the yoke strap contacts with the forward follower plate when the parts are in normal position. In order to supply the circular head portions 22 and 24 with lubricant where they contact with the curved journal face 25, recesses 57, filled with oily waste, are formed in the journal block 17, which recesses may be reached through oil holes 68 in the upper retaining plate 18, and holes 59 in the yoke strap 55, which register with the oil holes 58, when the parts are in normal relation.

In operation the action of the device is as follows:—Supposing that the draw bar is pulled forward, the yoke strap 55 draws against the follower plate 16 causing the rocking members 20 and 21 to rotate upon their axis by turning the circular head portions 22 and 24 against the journal block 17. As the rocking members 20 and 21 rotate, the outer ends spread, and during their spreading movement carry the friction plates 30 and 31 outwardly because of the coöperation of the collars 49 and 50, with the slots 47 and 48 in the guiding plates 45 and 46. Simultaneously the line of contact between the rocking members 20 and 21 and their respective friction plates 30 and 31, move toward the line of draw bar pull, or in other words, the fulcrum points move inwardly toward the center line of the device. As the rocking members turn and as the fulcrum points move inwardly, the yoke members 39 and 40 are drawn forward, and consequently draw the yoke plate 36 forward, thus compressing the draw bar springs 34 and 35. As the fulcrum points between the rocking members 20 and 21 and their respective friction plates 30 and 31 move toward the center line of the device, the effective power of the draw bar springs continually increases, for the reason that the leverage arm upon which they operate continually grows longer, and the lever arm through which the draw bar pull operates continually grows shorter. If it were possible to rotate the members 20 and 21, under draw bar pull, until the arrow B should become coincident with the line of draw bar pull, the effective power of the draw bar springs would be infinite. It is obviously impossible however, to practically reach this limit, and therefore it will be seen that no matter how strong the draw bar pull, it will always be pulling against resiliency due to the draw bar springs. It will also be seen that since the rolling surfaces 51 and 52 comprise rolling stop surfaces, which surfaces are continuous, it will be impossible for the stop members to be brought together with a sudden impact shock, for the reason, as has been hereinbefore explained, that as the radial line, presented by the arrow B, swings about its axis to approach the line of draw bar pull, the effective power of the draw bar springs becomes infinite. Therefore, it will be seen that no matter how strong the pull or shock against the draft mechanism, it is obviously impossible to ever arrive at the point where the shock ceases to be resisted by resiliency, consequently it is impossible to transmit an impact shock, as such, through the draft gear. As the rocking members 20 and 21 turn upon their axes, their respective friction plates 30 and 31, are moved inward and outward, as has been hereinbefore described, and the friction of these plates against the wear plate 44 tends to absorb all of the lighter vibratory shocks without transmitting them through the under sills to the car body. The wear plate 44 and friction plates 30 and 31 respectively, are all constructed to be easily replaced when worn. They are also constructed in such manner that wear upon these parts does not affect the operation of the device so long as there is a sufficient amount of the parts left to be operative at all.

Under buffing shocks the operation of the several parts is identical with the operation hereinbefore described, with the exception that the follower plate 16 remains stationary, while the forward follower plate including the journal block 17, is moved rearward under the pressure transmitted through the base of the draw bar 54.

As many changes could be made in the above described structure and many widely different embodiments of this invention might be made without departing from the scope thereof, the matter contained in the above described structure and shown in the accompanying drawings is to be taken as illustrative and not in a limiting sense.

I desire it also to be understood that the language used in the claims is intended to cover all generic and specific features of this invention herein described and all statements of the scope of the invention which as a matter of language might fall therebetween.

Having thus described my invention what I desire to claim is:—

1. A device of the class described including a draw bar, a car under frame, resilient means, lever arms with a shifting fulcrum for increasing the effective resistance of said resilient means as the thrust or pull upon said draw bar is increased, and friction shoes at all times sustaining the full draw-bar load.

2. A device of the class described including a draw bar, a car under frame, resilient means, lever arms with shifting fulcrums, means connecting said lever arms with said resilient means, whereby the effective resistance of said resilient means is increased as the thrust or pull upon said draw bar is increased, and friction shoes at all times sustaining the full draw-bar load.

3. A device of the class described, having in combination a front follower, a rear follower, a friction shoe slidable at right angles to the movement of said followers, said friction shoe being provided with a friction surface directly sustaining the draw-bar load and at right angles to the said direct draw bar load, means to slide said friction shoe when either of said followers are moved, and spring mechanism resisting the movement of said followers.

4. A device of the class described including a draw-bar, resilient members, rocking members, means operatively connecting said resilient members with said rocking members, friction shoes interposed between said rocking members and said resilient members, said friction shoes at all times sustaining the full draw-bar load, and means to slide said friction shoes when said resilient members are compressed.

5. In a device of the class described, the combination of follower stops, follower plates adapted to coöperate with said follower stops, resilient members, lever arms with shifting fulcrums for increasing the effective operation of said resilient members and to limit the movement of said follower plates, and the friction shoes between said lever-arms and one of said follower plates, said friction shoes having a movement opposite to the movement of said shifting fulcrums.

6. In a device of the class described, the combination of follower stops, follower plates adapted to coöperate with said follower stops, resilient members, rocking members coöperating with said resilient members and said follower plates to limit the movement of said follower plates, friction shoes between one of said follower plates and said rocking members, and means connecting said friction shoes and said rocking members to slide said friction shoes when said rocking members are rocked.

7. In a device of the class described, the combination of follower stops, follower plates coöperating with said follower stops, resilient means, rocking members carried by one of said follower plates, means operatively connecting said resilient members with said rocking members, a pair of friction shoes adapted at all times to sustain the full draw-bar load and connected with said last mentioned means to be moved transverse the line of draw-bar pull when said resilient means are compressed.

8. In a device of the class described, the combination of follower stops, follower plates coöperating with said follower stops, resilient means, rocking members carried by one of said follower plates, slidable friction members adapted to slide upon the other of said follower plates and to form a movable base upon which said rocking members rock, and means operatively connecting said resilient means with said rocking members.

9. A draft-rigging including in combination, a pair of followers, oppositely disposed levers mounted between said followers and having a common pivotal point in the line of draw-bar pull, draft-rigging springs operatively connected with the outer ends of said levers, and friction shoes between said levers and one of said followers.

10. In a draft-rigging in combination, a follower, springs upon one side of said follower, sliding friction means on the other side of said follower, and a lever of the first class having a shifting fulcrum operatively connected with said springs and with said friction shoes to move said friction shoes when said springs are compressed.

11. In a device of the class described, a pair of symmetric arms constituting levers of the first class, a follower provided with a common pivot for said levers, springs operatively connected with the outer ends of said arms, and friction members operatively connected with said arms and adapted for movement across the line of draw-bar pull when the outer ends of the arms move in opposite directions.

12. In a draft-rigging in combination, followers, friction shoes having flat friction surfaces slidable upon one of said followers in the direction of its length, draft-gear springs, and means connected with said draft-gear springs to slide said friction shoes when said springs are compressed.

13. In a device of the class described including in combination a draw bar, a car underframe, resilient means, a friction member slidable at right angles to the line of draw bar pull, and means rolling upon said friction member and operatively connecting said friction member with said resilient means to slide said friction member when said resilient means is effectively operated.

14. In a device of the class described in combination, a draw bar, a car underframe, resilient means, a friction member slidable at right angles to the line of draw bar pull and adapted to sustain the full draw bar load, and means operatively connecting said friction member with said resilient means to slide said friction member when said resilient means is operated in such manner that the motion of said friction member is decreased as the effectiveness of said resilient means is increased.

15. In a device of the class described in combination, a follower, oppositely disposed levers operatively connected to said follower, slidable friction shoes connected with said levers, and resilient members connected to said levers, the construction and arrangement of parts being such that as said resilient members are compressed said friction shoes are moved outwardly away from the line of draw bar pull and the fulcrum points of said levers are moved inwardly toward the line of draw bar pull.

16. In a draft rigging in combination, a draw bar, follower plates, resilient means, a rotary device operatively connected with said resilient means, and a friction shoe having straight line movement, said friction shoe being operatively connected to said rotary device in such manner that the rotation of said device moves the shoe in a straight line at a right angle to the line of draw bar pull.

17. In a draft rigging, the combination including a center sill, a built up end sill, a pair of horizontal plates serving as a connector between said sills, a draw bar extending through the end sill and draft rigging attached to and mounted between said plates.

18. In a draft rigging, the combination comprising a center sill, an end sill, a horizontally disposed plate serving as a connector for said sills, follower stops carried by and secured to said plate, and friction draft gear supported by said plates and adapted to coöperate with said follower stops.

19. In a device of the class described in combination, a car under frame, a pair of followers, stops for said followers, draft springs mounted upon one of said followers and extending away from the other of said followers, friction members between said followers and means operatively connecting said springs with said friction members.

20. A draft gear for railway cars comprising in combination a forward follower, a rear follower, a draft spring mounted upon and supported by said rear follower, said draft spring extending away from said forward follower, a non-resilient member between said followers and adapted to move to permit said followers to approach each other, and means connecting said draft spring with said member whereby said draft spring is compressed when said member is moved.

21. A railway draft gear comprising in combination a pair of followers, draft springs mounted upon and movable with one of said followers and extending away from the other of said followers, means intermediate both of said followers and operatively connected to said draft springs whereby when either of said followers are moved said draft springs are compressed.

GEORGE W. RAMSEY.

Witnesses:
M. B. NICHOLS,
WALLACE J. HILL.

Copies of this patent may be obtained for five cents each, by addressing the "Commissioner of Patents, Washington, D. C."